UNITED STATES PATENT OFFICE.

JOSÈ G. SARAVIA, OF SAN SALVADOR, SALVADOR.

INVESTMENT COMPOSITION.

1,407,774.   Specification of Letters Patent.   Patented Feb. 28, 1922.

No Drawing.   Application filed May 23, 1921.   Serial No. 471,917.

*To all whom it may concern:*

Be it known that I, JOSÈ G. SARAVIA, citizen of Honduras, Central America, residing at San Salvador, El Salvador, Central America, have invented certain new and useful Improvements in Investment Compositions, of which the following is a specification.

My invention relates to investment compositions and more particularly to dental investment compositions.

It is necessary in order to accurately and efficiently solder together the units of a dental bridge, to enclose the same in an investment composition. To prevent the distorting of the bridge units it is desirable that the investment composition hold the units in situ during the preliminary heating and final soldering operation. This may be accomplished by the use of an investment of a substantially non-contracting character.

Plaster of Paris, calcium sulphate, in combination with various ingredients, has been used for investments, but these are all more or less of a contracting character. During the process of burning gypsum the water is driven off, and the product resulting therefrom is the ordinary plaster of Paris of commerce, which possesses the familiar property of recombining with water. Upon heating such a composition it shrinks considerably. In order to provide a material of a substantially non-contracting character it is necessary to compensate for this contraction.

The object of my invention is the provision of an investment composition of a substantially non-contracting character.

I have found that a composition composed of plaster of Paris, and a material capable of expanding on heating, such as cement, preferably white Roman cement, and graded silica particles in the condition of coarse and light grains, admirably fulfils the requirements set forth providing a substantially non-contracting investment.

The preferred proportion in which the constituents are combined are as follows:

Slow hardening plaster of Paris _ 20 parts
White Roman cement _____ 10 ”
Quartz, coarse grains _____ 50 ”
Quartz, light grains _____ 20 ”

It is preferred that the quartz be the Saint Anne white quartz found near Saint Anne, San Salvador.

Silica possesses the property of expanding upon heating and it is this property which is depended upon to offset the contraction of the plaster of Paris. In order to successfully compensate for the shrinkage of the plaster of Paris, it is necessary that the silica be present in an amount considerably greater than the plaster of Paris and of different graded sizes. The Portland cement also acts to prevent contraction. My experiments have shown that composition consisting of plaster of Paris and quartz in graded sizes is not as non-contracting as those in which the Roman cement is present. My invention resides broadly in the combination of the constituents referred to; more specifically in the percentages indicated.

While my composition is more particularly suitable as a dental investment it may also be used for investment purposes by jewelers.

I claim:

1. An investment composition comprising plaster of Paris and a material capable of expanding on the application of heat consisting of Roman cement and silica in graded sizes.

2. An investment composition comprising plaster of Paris, a hardening cement and silica in graded sizes.

3. An investment composition comprising plaster of Paris, Roman cement and quartz in graded sizes.

4. An investment composition comprising plaster of Paris, 20 parts; Roman cement 10 parts; coarse grain quartz 50 parts, and light grain quartz 20 parts.

5. An investment composition comprising plaster of Paris 20 parts; white Roman cement 10 parts; coarse grain white quartz 50 parts and light grain quartz 20 parts.

In testimony whereof I hereunto affix my signature.

JOSÈ G. SARAVIA.